Figure 1:
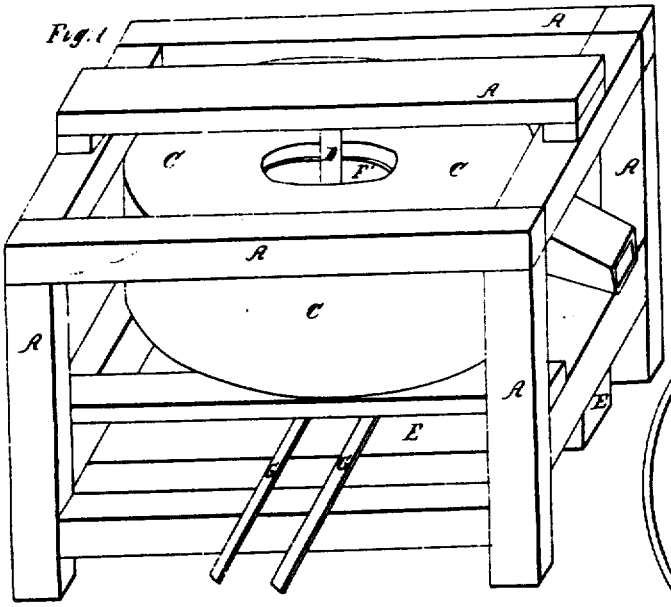
Figure 4:
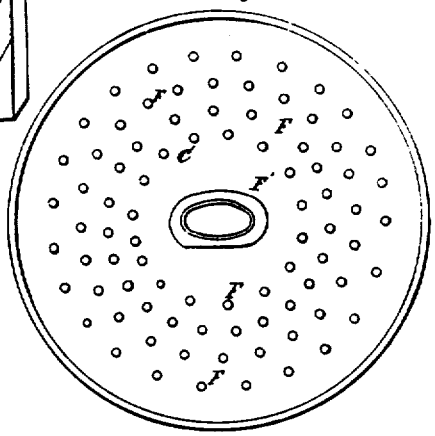
Figure 3:
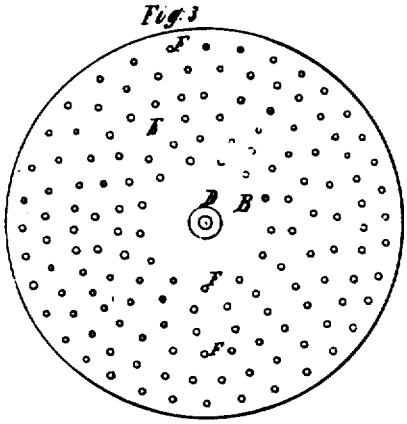
Figure 2:
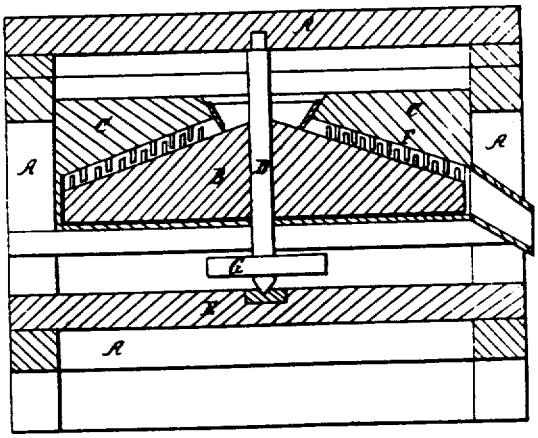

NO PRINTED SPECIFICATION AVAILABLE

BEST AVAILABLE COPY

X-8,489½ W. C. Grimes.

Hulling Mach.

Patented Nov. 8, 1834.

J. PETERS, PHOTO-LITHOGRAPHER, WASHINGTON, D. C.

William C. Grimes, of York. Penn:
Letters Patent.

8489 1/2

The schedule referred to in these Letters Patent and making part of the same, containing a description in the words of the said William C. Grimes himself, of his improvement in a machine for hulling clover & other seed —

---

To all to whom these presents shall come — Be it known, that I, William C. Grimes of York, in the County of York, and State of Pennsylvania have invented a new & useful machine for hulling clover and other seed, & that the following is a full and exact description of the construction & operation of the said machine as invented by me. —

Upon a vertical spindle or shaft, similar to that of a grinding mill, is affixed a wheel or runner the upper surface of which is made in the form of a low or obtuse cone, rising at an angle of about twenty degrees from the horizon (more or less) thus far being similar in form to the old fashioned stone rubbers for hulling clover seed.

Over the runner is placed an inverted cone or cap, fitting on to the runner; the two surfaces, however of the cap and runner, are not to approach nearer than about an inch (more or less). Into the contiguous surfaces or faces of the cap and runner, are driven concentric rows or circles of teeth which last may be common cut spikes, or other suitable material. The space between these concentric circles or rows of teeth may be an inch and a fourth (more or less). The teeth on the runner work between those in the cap, hence the said concentric rows of teeth on the runner and cap, when fixed for operation, are alternate, those of the runner standing up between those of the cap, and those of the latter projecting downwards between those of the former: thus bringing the alternate rows to within about five eighths of an inch from centre to centre, and leaving in the clear, about three eighths of an inch, if the teeth are a fourth of an inch thick, which I think a suitable size. The teeth in the rows are usually placed about three fourths of an inch, the one from the other, but the distance may be very much varied, and the number of circles or rows of teeth in the cap, may correspond with those in the runner. —

Instead, or in place of the concentric rows of spikes or teeth, I intend sometimes to use hoops of rolled iron, fastened by their edges to the cone, and punched full of round holes, or the holes may be oblong, standing up and down, and also to cut or file teeth upon the edges of the said hoops. The diameter of the runner may be very Drawing

8489½ X much varied, as from one to ten feet, but from three to five feet, I think the most convenient – The teeth occupy only about one half of the diameter of the face of the wheel or runner, but much more than half its surface, as the rows or circles of teeth commence at or near its periphery, and extend about half way to its centre: the remaining part of the face of the runner, that is around the centre, extending to about one half of its diameter, is covered with punched sheet iron, or made rough by other means, as with emery, or otherwise. The runner and cap may be made of wood, metal, or other material: when made of wood, they may be built up of successive layers of plank or boards – the grain of each succeeding layer crossing that of the preceding, when made of metal they may be cast to the proper form, with no greater thickness than what may be necessary to have the requisite strength. The teeth may be cast in the cone, or the latter may be drilled, and the teeth put in afterward –

A vertical rim from the periphery of the concave cap surrounds the runner, leaving a space of about an inch between the periphery of the runner, and the inside of the rim. A spout similar to the spout from a flour mill, but of much larger caliber or capacity, is let into the aforesaid space for the purpose of discharging the seed and chaff from the machine, and conducting them to the fans –

Said fans may be of the ordinary construction for separating the chaff from the seed, but should be sufficiently large to suit the capacity of the machine –

Through the top or centre of the cap, is made an oblong or long oval opening, crossing the centre of the runner, and extending each way as far or nearly, as the roughened surface of the runner; the sides of this opening open at an angle of about forty-five degrees from a vertical line, and may be lined with sheet iron, or other metal, which lining is to approach to within about one eighth of an inch of the roughened surface of the runner, and rise about three or four inches above it. The object of having the sides of the opening in the cap inclined, and the lining approach near to the runner is to prevent large and hard bodies, such as stones, &c. from passing into the machine to injure the teeth –

When stones, nails or sticks, &c. happen to fall in upon the roughened surface of the runner, the latter throws them against the inclined sides of the opening in the cap with such force as to cause them to bound to some distance from the opening – even small straws are thrown out in this way: yet notwithstanding this the unhulled seed is drawn in with great rapidity – The spindle of the runner may run in a box or step beneath upon a bridge-tree, like the spindle of a mill, and be supported above, in a suitable box or bush, or the spindle may pass up through the opening in the cap, and be supported in a suitable box above. The length of the said spindle ought to be at least as great as the diameter of the runner, and upon and near the lower end thereof, I put a pulley or strap wheel, which is to give motion to the runner, which should have from five to twelve hundred revolutions per minute, according to its size and other circumstances —

What I claim as new, and as my invention in the before described machine for hulling clover, and other seed, and for which I ask an exclusive privilege, is, the concentric rows of teeth, placed in circles upon the cones, in the manner described, or instead thereof, hoops toothed and punched, so as to operate between each other in a similar way and produce a like effect. I also claim the general arrangement, of that part of the machine, by which the feeding is effected, and whereby stones or other foreign substances are thrown therefrom —

Cyd
M.C

Witnesses
Ziba Webb
Robt. Clarke

Wm. C. Grimes

Drawing 1216 words